(12) United States Patent
Liu et al.

(10) Patent No.: US 9,098,078 B2
(45) Date of Patent: Aug. 4, 2015

(54) CONTROL ALGORITHM BASED ON MODELING A CONTROLLED OBJECT

(75) Inventors: Bao Liu, Qingdao (CN); Junhong Wang, Qingdao (CN)

(73) Assignee: China University of Petroleum, QingDao, Shandong (CN)

( * ) Notice: Subject to any disclaimer, the term of this patent is extended or adjusted under 35 U.S.C. 154(b) by 381 days.

(21) Appl. No.: 13/184,842

(22) Filed: Jul. 18, 2011

(65) Prior Publication Data

US 2012/0310375 A1 Dec. 6, 2012

(30) Foreign Application Priority Data

Jun. 2, 2011 (CN) ................................ 20111047217

(51) Int. Cl.
*G05B 13/04* (2006.01)
(52) U.S. Cl.
CPC ...................................... *G05B 13/04* (2013.01)
(58) Field of Classification Search
None
See application file for complete search history.

(56) References Cited

U.S. PATENT DOCUMENTS

| | | | | |
|---|---|---|---|---|
| 5,245,528 | A * | 9/1993 | Saito et al. | 700/41 |
| 5,301,101 | A * | 4/1994 | MacArthur et al. | 700/37 |
| 5,442,544 | A * | 8/1995 | Jelinek | 700/29 |
| 5,519,605 | A * | 5/1996 | Cawlfield | 700/31 |
| 5,708,341 | A * | 1/1998 | Ishida | 318/561 |
| 5,812,428 | A * | 9/1998 | Zou et al. | 700/34 |
| 6,330,483 | B1 * | 12/2001 | Dailey | 700/28 |
| 6,501,998 | B1 * | 12/2002 | Pfeiffer | 700/37 |
| 7,117,045 | B2 * | 10/2006 | Hittle et al. | 700/48 |
| 7,620,462 | B2 * | 11/2009 | Higuchi et al. | 700/37 |
| 2002/0117202 | A1 * | 8/2002 | Tinsley et al. | 137/2 |
| 2003/0199997 | A1 * | 10/2003 | Gao | 700/18 |
| 2006/0136185 | A1 * | 6/2006 | Kim et al. | 703/11 |
| 2006/0173558 | A1 * | 8/2006 | Futatsugi et al. | 700/28 |
| 2006/0217819 | A1 * | 9/2006 | Cao et al. | 700/28 |
| 2006/0259197 | A1 * | 11/2006 | Boe et al. | 700/246 |
| 2009/0182697 | A1 * | 7/2009 | Massaquoi | 706/44 |

OTHER PUBLICATIONS

"Time Constant". Wikipedia (printed Dec, 10, 2014): p. 1.*
Donghai Li, Yongqiang Wu, Liqin Li etal., Simulation study of PID control system for several industrial plants [J], Application of Electronic Technique, 2000, 26 (8) :24-26.
Shushu Ma, Songxi Chen, Jun Yang, Research on IMC-PID control for the complex time-delay system reduction [J], Industrial Instrumentation and Automation, 2010, (2) :3-5, 11.

* cited by examiner

*Primary Examiner* — Ryan Jarrett
(74) *Attorney, Agent, or Firm* — IPro, Inc.; Na Xu (57) ABSTRACT

An embedded nonlinear cooperative pulse-controller (ENCPC) is characterized in that its control algorithm module comprises a comparison module, an identification control unit, a dynamic control unit, a steady-state control unit and a cooperative control unit. The comparison module generates control errors. The identification control unit identifies the model parameters, the time constant and the delay time. The dynamic control unit rapidly reduces the control errors, improves the rise time and decreases the overshoot of the control system. The steady-state control unit further eliminates the control errors in a steady change process and improves the control precision. The cooperative control unit coordinates and generates the final control output signal. The control algorithm module of the ENCPC enables that the ENCPC can quickly and stably eliminate the control errors with short rise time, small overshoot and short settling time.

9 Claims, 6 Drawing Sheets

CONTROL ALGORITHM BASED ON MODELING A CONTROLLED OBJECT

CROSS-REFERENCE TO RELATED APPLICATIONS

This application claims priority to Chinese Patent Application Serial No. 201110147217.1, the disclosure of which is hereby incorporated by reference in its entirety.

TECHNOLOGY FIELD

The invention relates to the field of intelligent control technology, specifically relates to an embedded nonlinear cooperative pulse-controller that regulates a dynamic change process and a steady change process of a control system relatively independently.

BACKGROUND

With the development of modern industry, more and more complex process objects have appeared in the industrial control process. While the requirements for product quality have been increased, traditional control technologies can hardly adapt to these control requirements. In order to improve the control effectiveness, since the 1970s some intelligent control technologies such as expert control, neural network control, fuzzy control and predictive control have been developed or inspired by empirical process operations or biological control principles. These control technologies have played an important role in improving the control effectiveness of some objects in complex processes. However, these control technologies are complex and difficult to implement and apply, which affects their applications and promotions in process engineering projects.

SUMMARY

The purpose of the this invention is to overcome the disadvantages of the aforementioned available technologies and to provide an embedded nonlinear cooperative pulse-controller (abbreviated as ENCPC), which comprises an AD conversion circuit, a DA conversion circuit, a central processor CPU, a program memory, a data memory and peripheral interface circuits, etc. The ENCPC is designed based on "expert ideology for fast adjustment and control" to relatively independently regulate the dynamic change process and the steady change process during the control process of a control system. The ENCPC features a control algorithm module, which comprises a comparison module, an identification control unit, a dynamic control unit, a steady-state control unit and a cooperative control unit. Among them, the comparison module plays a major role of generating control errors; the identification control unit, mainly through step response, identifies model parameters such as amplification gain, time constant and delay time of the controlled object; the dynamic control unit plays a major role of rapidly reducing the control errors in the dynamic change process, improving the rise time of the control system and decreasing the overshoot of the control system by rapidly outputting a regulation pulse, which can make process variable (i.e., variable the control system is configured to control) rapidly approach desired steady-state value; the steady-state control unit plays a major role of further eliminating the control errors in the steady change process and improving control precision, according to future steady-state output of the ENCPC and in conjunction with proportional and integral control laws; the cooperative control unit, in accordance to the real-time operation status of the control system, is responsible for coordinating the operation of the identification control unit, the dynamic control unit and the steady-state control unit, and generating the final control output signals, such that the ENCPC can quickly and stably eliminate the control errors with short rise time, small overshoot, and short settling time.

Below is an overview of the "expert ideology for fast adjustment and control".

In the actual process operation, for experienced operators, they are always able to control a process system to quickly reach a steady state at a relatively fast speed with relatively small overshoot and short settling time. For example, in a regulation process of a liquid level in a container, if the level is far below a target value, the operator typically begins to quickly open a feed valve to its maximum position. When the liquid level is close to the target level, the operator rapidly decreases valve position, so that the process variable (here the liquid level) can quickly and stably reach the target value without overshoot. Such regulation law that the operator uses is just like a pulse. In addition, many optimal control algorithms use regulation laws that generate controlled output in a form of pulses. In some ideal conditions, such regulation laws can enable the process variable to rapidly reach their steady state with a short rise time, no or small overshoot and short settling time.

Below is an overview of the operation mechanism of the embedded nonlinear cooperative pulse-controller based on the "expert ideology for fast adjustment and control".

The embedded nonlinear cooperative pulse-controller is designed based on the "expert ideology for fast adjustment and control", and its the control algorithm module comprises the comparison module, the identification control unit, the dynamic control unit, the steady-state control unit and the cooperative control unit, and has the capability of rapidly and stably eliminating the control errors. Among them, the comparison module plays a major role of generating the control errors; the identification control unit, mainly through step response, identifies the model parameters such as the amplification gain, the time constant and the delay time of the controlled object; the dynamic control unit plays the major role of rapidly reducing the control errors in the dynamic change process, improving the rise time of the control system and decreasing the overshoot of the control system by rapidly outputting a regulation pulse, which can make the process variable rapidly approach the desired steady-state value; the steady-state control unit plays the major role of further eliminating the control errors in the steady change process and improving the control precision, according to the future steady-state output of the ENCPC and in conjunction with proportional and integral control laws; the cooperative control unit, according to the real-time operation status of the control system, is responsible for coordinating the operation of the identification control unit, the dynamic control unit and the steady-state control unit, and generating the final control output signals, such that the ENCPC can quickly and stably eliminate the control errors with short rise time, small overshoot and short settling time.

The control algorithm module of the embedded nonlinear cooperative pulse-controller comprises the comparison module, the identification control unit, the dynamic control unit, the steady-state control unit and the cooperative control unit. Among them, the comparison module plays the major role of generating the control errors; the identification control unit, mainly through the step response, identifies the model parameters such as the amplification gain, the time constant and the delay time; the dynamic control unit plays the major role of rapidly reducing the control errors in the dynamic change process, improving the rise time of the control system and decreasing the overshoot of the control system by rapidly outputting a regulation pulse, which can make the process variable rapidly approach the desired steady-state value; the steady-state control unit plays the major role of further eliminating the control errors in the steady change process and improving the control precision, according to the future steady-state output of the ENCPC and in conjunction with proportional and integral control laws; the cooperative control unit, in accordance to the real-time operation status of the control system, is responsible for coordinating the operation of the identification control unit, the dynamic control unit and the steady-state control unit, and generating the final control output signal. The control algorithm module of the ENCPC enables that the ENCPC can quickly and stably eliminate the control errors with short rise time, small overshoot and short settling time.

Further elaboration of the comparison module, the identification control unit, the dynamic control unit, the steady-state control unit and the cooperative control unit and their algorithms is as below.

First, the comparison module and its algorithms have the following features.

The comparison module mainly compares the process set-point value (i.e., the target value) of the process variable and a feedback signal of a control system to generate the control errors. The process set-point value is denoted as sp(t), the feedback signal is denoted as b(t), the control error is denoted as e(t), wherein:

$$e(t)=sp(t)-b(t) \quad (1)$$

Second, the identification control unit and its algorithms have the following features.

The identification control unit mainly identifies the model parameters such as the amplification gain, the time constant and the delay time of the controlled object.

For most control systems, the process models of their controlled objects can be linearized within a range near their working point, and approximated by the following transfer function, $$G_p(s) \approx \frac{K}{1+Ts} e^{-\tau s} \quad (2)$$

wherein, K, T, τ are the amplification gain, the time constant and the delay time of the controlled object, respectively, which can be obtained by a two-point identification method of step response. First, two points at time $t_1$, $t_2$ are identified from the sampled data of step response, and $t_1$ and $t_2$ satisfy the following conditions
$y(t_1)=0.384 \cdot y_{ss}(t)$ and $y(t_2)=0.632 \cdot y_{ss}(t)$, where $y_{ss}(t)$ is the steady-state value of the process variable. Then, the model parameters of the controlled object are calculated according to the following equations, $$\begin{cases} T = 2(t_2 - t_1) \\ \tau = 2t_1 - t_2 \end{cases} \quad (3)$$

$$K = \frac{y_{ss}(t) - y_0(t)}{u_{ss}(t) - u_0(t)} \quad (4)$$

Wherein $y_0(t)$ is the initial value of the process variable, and $u_{ss}(t), u_0(t)$ are the steady-state output value and the initial output value of the ENCPC, respectively.

Because the steady-state value of the process variable and the process set-point value are the same when the control system is stable, i.e. $y_{ss}(t)=sp(t)$. From the equation (4) the following equation is obtained:

$$u_{ss}(t) = \frac{sp(t) - y_0(t)}{K} + u_0(t) \quad (5)$$

Therefore, as long as the amplification gain K of the controlled object is obtained, the steady-state output value $u_{ss}(t)$ of the ENCPC can be derived easily.

Third, the dynamic control unit and its algorithms have the following features.

The dynamic control unit is mainly responsible for rapidly reducing the control errors in the dynamic change process, improving the rise time of the control system and decreasing the overshoot of the control system by rapidly outputting a regulation pulse which can make the process variable rapidly approach the desired steady-state value.

Because the dynamic control unit is to make the dynamic change process of the controlled object to have relatively short rise time and small overshoot. Therefore, the output process of the dynamic control unit is designed to be like a pulse-output that comprises two stages which include an increase variation and a decrease variation. $u_{up}(t)$, $u_{down}(t)$ represent the output value of the increase variation and the decrease variation of the control pulse-output, respectively. The time of change for the process set-point value of the control system is denoted by $t_0$.

The algorithms of the dynamic control unit follow the principles below.

(1) Principle of the Increase Variation.

$u_m(t)$ is denoted as the peak value of the pulse-output of the ENCPC after the process set-point value of the control system changes in the dynamic change process. Relative to the time $t_0$, $t_m$ is denoted as the time when the ENCPC output reaches $u_m(t)$.

After the process set-point value changes, the ENCPC rapidly changes its output from the initial value $u_0(t)$ at the time $t=t_0$ to the peak value $u_m(t)$. Assuming the future steady-state output value of the ENCPC is $u_{ss}(t)$ (according to equation (5)) after the ENCPC eliminates the control errors. Relative to the initial output value $u_0(t)$ of the ENCPC, the variation $\Delta u_m(t)$ of the peak value is:

$$\Delta u_m(t) = u_m(t) - u_0(t) = \alpha \cdot (u_{ss}(t) - u_0(t)) \quad (6)$$

Wherein, α is the gain coefficient of the pulse-output, and α>1, and $u_L \leq \Delta u_m(t) \leq u_{ss}(t)$ or $u_{ss}(t) \leq \Delta u_m(t) \leq u_H$. And $u_L$ and $u_H$ are the low limit and high limit of the ENCPC output, respectively.

To ensure that the ENCPC changes its output relatively stably from $u_0(t)$ to $u_m(t)$, a filtering component is designed as shown in equation (7), $$f_{up}(t) = 1 - e^{-\frac{1}{T_{up}}(t-t_0)} \quad (7)$$

Wherein, $T_{up}$ is a filter time constant for the increase of the pulse-output, and $T_{up} < t_m$, and $T_{up}=1 \sim 5 T_s$, where $T_s$ is the sampling control cycle. By combining equations (6) and (7), the law of the increase variation $u_{up}(t)$ of the pulse-output is deduced as:

$$u_{up}(t)=u_0(t)+\alpha \cdot (u_{ss}(t)-u_0(t)) \cdot f_{up}(t) \qquad (8)$$

From equations (7) and (8), it is derived that the initial value of $u_{up}(t)$ at the time $t=t_0$ is $u_0(t)$, and its stable variation value is $u_{up}(t)=u_0(t)+\Delta u_m(t)=u_m(t)$.

(2) Principle of Decrease Variation.

Relative to the time $t_0$, $t_d$ is denoted as the time when the ENCPC changes its output to the opposite direction after it reaches the peak value $u_m(t)$. When control time $t \leq t_0+t_d$, the output signal of the ENCPC quickly changes to be close to the future steady-state output value $u_{ss}(t)$. In order that the ENCPC makes a stable output change from $u_m(t)$ to $u_{ss}(t)$, and for the guarantee of adjustment effects, one other filtering component is also designed as shown in equation (9):

$$f_{down}(t) = 1 - e^{-\frac{1}{T_{down}}(t-t_d)} \cdot \frac{|e(t)|}{|e(t_d)|} \qquad (9)$$

Wherein, $T_{down}$ is the filter time constant for the decrease of the pulse-output, and $T_{down}=0.1\sim0.5T$; $|e(t)|$ is the absolute value of the current control error; and $|e(t_d)|$ is the absolute value of the control error at the time $t=t_0+t_d$. Accordingly, the law of the decrease variation $u_{down}(t)$ of the pulse-output is as follows:

$$u_{down}(t)=u_m(t)+(u_{ss}(t)-u_m(t)) \cdot f_{down}(t) \qquad (10)$$

From equations (9) and (10), it is derived that the initial value of $u_{down}(t)$ at the time $t=t_0+t_d$ is $u_m(t)$, and its stable change value is the steady-state output value $u_{ss}(t)$.

Forth, the steady-state control unit and its algorithms have the following features.

The steady-state control unit plays the major role of further eliminating control error in the steady change process and improving the control precision.

When the control error and its change value satisfy $|e(t)| \leq \epsilon_1$ and $|\Delta e(t)| \leq \epsilon_2$, wherein $\epsilon_1$, $\epsilon_2$ are both positive real numbers and $\epsilon_2 < \epsilon_1$, the current moment is denoted as $t_{ss}$ relative to the time $t_0$. In order to quickly eliminate the control error and improve control precision, when control time $t \geq t_0+t_{ss}$, the control output of the ENCPC is switched from the decrease variation $u_{down}(t)$ of the pulse-output to proportional and integral control law as shown in equation (11)

$$u_s(t)=u_s(t-1)+K_p \cdot \Delta e(t)+K \cdot e(t) \qquad (11)$$

Wherein, $u_s(t)$ is the control output signal of the ENCPC during the steady change process, and $K_p$ is the proportional coefficient, and $K_1$ is the integral coefficient, and $u_s(t-1)$ is the ENCPC output value of the last sampling control cycle, and $\Delta e(t)$ is the change value of the current control error. When the control system becomes stable, the final $u_s(t)$ replaces the original calculated steady-state output value $u_{ss}(t)$, and the current output is kept unchanged. If there is random noise, and when the absolute value of the control error $|e(t)| \geq \epsilon_3$, the following control rule can be applied $$u_s(t)=u_{ss}(t)+K_p \cdot e(t) \qquad (12)$$

Wherein $\epsilon_3$ is a positive real number.

Fifth, the cooperative control unit and its algorithms have the following features.

The cooperative control unit, in accordance with the real-time operation status of the control system, coordinates the operations of the identification control unit, the dynamic control unit and the steady-state control unit, and generates the final control output signal.

(1) When the control time $t \geq 0$, the identification control unit is in working condition, and identifies the model parameters K, T, $\tau$ of the controlled object;

(2) When the control time $t_0 \leq t < t_0+t_{ss}$, the dynamic control unit is in working condition;

Wherein, when the control time $t_0 \leq t < t_0+t_d$, the ENCPC outputs its increase variation law of the pulse-output $u_{up}(t)$, i.e. equation (8);

Wherein, when the control time $t_0+t_d \leq t < t_0+t_{ss}$, the ENCPC outputs its decrease variation law of the pulse-output $u_{down}(t)$, i.e. equation (10).

(3) When the control time $t \geq t_0+t_{ss}$, the steady-state control unit is in working condition, and the ENCPC outputs its steady-state control law $u_s(t)$, i.e. equation (11); if there is random noise, when the absolute value of control error $|e(t)| \geq \epsilon_3$, the control law in equation (12) is in use.

When the process set-point value changes again, the control time t is reset to the time $t_0$, and the above control work process steps (2) to (3) are repeated.

Sixth, adjustment method of the control parameters is as below.

The dynamic control unit and the steady-state control unit of the invention are relatively independent from each other, therefore their control parameters can be individually adjusted.

(1) According to the speed of increase and the amount of the overshoot of the process variable in the dynamic change process, $\alpha$ or $t_d$ can be adjusted. If there is an excessive overshoot or an overtly rapid rise, $\alpha$ or $t_d$ can be reduced; if there is an inadequate overshoot or an overtly slow rise, $\alpha$ or $t_d$ can be increased.

(2) According to the changes of the process variable in the steady change process, the proportional coefficient $K_p$ and integral coefficient $K_i$ can be adjusted. If the speed of process variable approaching the steady state is too slow, the proportional coefficient $K_p$ can be increased; if the speed of process variable approaching the steady-state is too fast, the proportional coefficient $K_p$ can be decreased. If the control precision is very poor, the integral coefficient $K_i$ can be increased; if there is a steady-state oscillation, the integral coefficient $K_i$ can be decreased.

(3) Other control parameters $T_{up}$, $T_{down}$ are set within the defined specified range of values, i.e. $T_{up}=1\sim5T_s$, and $T_{down}=0.1\sim0.5T$.

The invention of the embedded nonlinear cooperative pulse-controller is characterized in that its control algorithm modules is also configured to output step signal, determine the stability of process variable, calculate the model parameters, calculate the control error, determine the completeness of dynamic change process, calculate the output of the steady-state control unit, collaborate the final control output, determine the completeness of the whole control task, calculate the output of the dynamic control unit.

Definitions of the concepts (or terms) that relate to this invention are given as below.

The paragraph of the introduction of background technology states " . . . more and more complex process objects have appeared . . . " Therefore, in the description of the invention uses related terms such as "process object", "controlled object", "process variable", "process model", "transfer function", "model parameter", "process set-point value", etc. Their respective meanings are explained as follows.

Process Object: refers to the machinery and equipment with requirements for automatic or manual control, production process or other objects.

Controlled Object: When the process object becomes the controlled process object of the control system, it is often referred to as the "controlled object."

Process variable: refers to the process output variable of a process object.

Process model: refers to the mathematical model of a process object.

Transfer function: refers to an expression of the mathematical model of a process object.

Model parameter: refers to the composition parameters of the mathematical model of a process object.

Process set-point value: refers to the input signal set by the process control system, which is the target value of the process variable of a controlled object.

Control system: refers to the combination of a controller and a controlled object, which is an integrated system capable of implementing automatic or manual control to the controlled object.

The "process variables" are set (or composed) by various "parameters" related to the "process", and different "parameters" form different "process models", which are often expressed by "transfer functions" in the automatic control theory.

In the field of industrial control technology, the "controlled object" often refers to the "process object" that is controlled or regulated by an automatic control system. Wherein, the "controlled object" may be also referred to as the "process object". For every control system, its regulation process includes two stages, i.e. the "dynamic change process" and the "steady change process".

As for this invention, the goal of the control system is to achieve the precise control effect of the "process variable" of the "controlled object", by regulating the process input signal of the "process object" through the controller output signal, so that the "process variable" of the "process object" in the "process" ultimately have zero deviation with the "process set-point value" input signal of the automatic control system in this disclosed invention "device".

Description of the labels in the drawings is as below.

1: process set-point value; 2: Comparison module; 3: Control error signal; 4: Identification control unit; 5: Communication signals between the Identification control unit and the dynamic control unit; 6: Dynamic control unit; 7: Output signal of the identification control unit; 8: Control output signal in feedback to the Identification control unit; 9: Output signal of the controller; 10: The controlled object; 11: The process variable signal in feedback to the identification control unit; 12: The process variable signal; 13: The feedback signal; 14: Cooperative control unit; 15: Output signal of the steady-state control unit; 16: Output signal of the dynamic control unit; 17: Communication signals between the dynamic control unit and the steady-state control unit; 18: Steady-state control unit; 19: Control algorithm module of the embedded nonlinear cooperative pulse-controller; 20: Program memory; 21: Data memory; 22: The memory interface circuit; 23: DA conversion circuit; 24: Central process unit CPU; 25: Peripheral interface circuits; 26: AD conversion circuit.

101: Output step signal; 102: Determine the stability of process variable; 103: Calculate the model parameters; 104: Calculate the control error; 105: Determine the completeness of dynamic change process; 106: Calculate the output of the steady-state control unit; 107: Collaborate the final control output; 108: Determine the completeness of the whole control task; 109: Calculate the output of the dynamic control unit.

DETAILED DESCRIPTION

A detailed description in reference of the drawings and embodiments of the invention is as below.

Figure 1:
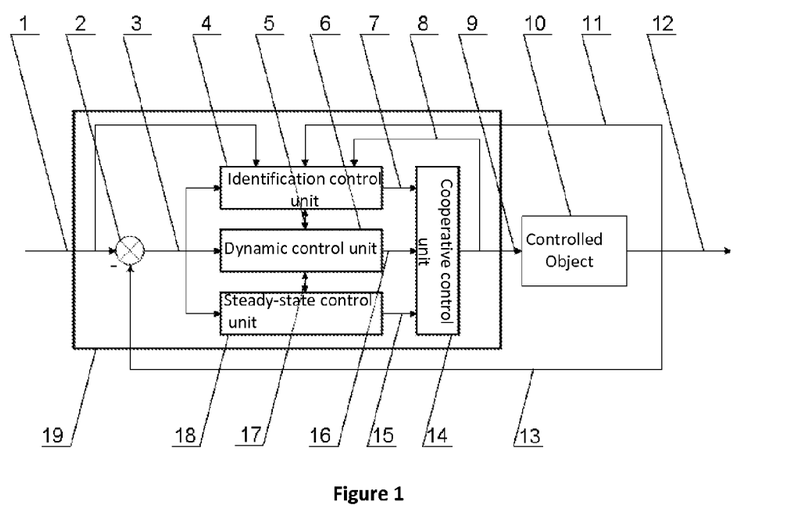
FIG. 1 is a block diagram of the control system according to an embodiment.

The embedded nonlinear cooperative pulse-controller (as shown in FIG. 1) is characterized in that its control algorithm module 19 comprises: the comparison module 2 that plays the major role of generating the control errors; the identification control unit 4 that, mainly through the step response, identifies the model parameters such as the amplification gain, the time constant and the delay time; the dynamic control unit 6 that plays the major role of rapidly reducing the control errors in the dynamic change process, improving the rise time of the control system and decreasing the overshoot of the control system by rapidly outputting a regulation pulse, which can make the process variable rapidly approach the desired steady-state value; the steady-state control unit 18 that plays the major role of further eliminating the control errors in the steady change process and improving the control precision, according to the future steady-state output of the ENCPC and in conjunction with proportional and integral control laws; the cooperative control unit 14 that, in accordance to the real-time operation status of the control system, is responsible for coordinating the operations of the identification control unit 4, the dynamic control unit 6 and the steady-state control unit 18, and generating the final control output signal. The control algorithm module 19 of the ENCPC enables that the ENCPC can quickly and stably eliminate the control errors with short rise time, small overshoot and short settling time.

The comparison module 2 and its algorithms have the following features.

The comparison module 2 mainly compares the process set-point value 1 and the feedback signal 13 of a control system to generate the control error 3. According to an embodiment, the process set-point value is denoted as sp(t); the feedback signal is denoted as b(t); the control error is denoted as e(t), wherein:

$$e(t) = sp(t) - b(t) \tag{1}$$

The identification control unit 4 and its algorithms have the following features.

The identification control unit 4 mainly identifies the model parameters such as the amplification gain, the time constant and the delay time of the controlled object.

For most control systems, the process models of their controlled objects can be linearized within a range near their working point, and approximated by the following exemplary transfer function:

$$G_p(s) \approx \frac{K}{1+Ts} e^{-\tau s} \quad (2)$$

Wherein, K, T, τ are the amplification gain, the time constant and the delay time of the controlled object, respectively, which can be obtained by a two-point identification method of step response. First, two points at time $t_1$, $t_2$ are identified from the sampled data of step response, and $t_1$ and $t_2$ satisfy the following conditions $y(t_1)=0.384 \cdot y_{ss}(t)$ and $y(t_2)=0.632 \cdot y_{ss}(t)$, where $y_{ss}(t)$ is the steady-state value of the process variable. Then, the model parameters of the controlled object are calculated according to the following equations:

$$\begin{cases} T = 2(t_2 - t_1) \\ \tau = 2t_1 - t_2 \end{cases} \quad (3)$$

$$K = \frac{y_{ss}(t) - y_0(t)}{u_{ss}(t) - u_0(t)} \quad (4)$$

Wherein $y_0(t)$ is the initial value of the process variable, and $u_{ss}(t), u_0(t)$ are the steady-state output value and the initial output value of the ENCPC, respectively.

Because the steady-state value of process variable and the process set-point value are the same when the control system is stable, i.e. $y_{ss}(t)=sp(t)$, from the equation (4) the following equation is obtained:

$$u_{ss}(t) = \frac{sp(t) - y_0(t)}{K} + u_0(t) \quad (5)$$

As long as the amplification gain K of the controlled object is obtained, the steady-state output value $u_{ss}(t)$ of the ENCPC can be derived easily.

The dynamic control unit 6 and its algorithms have the following features.

The dynamic control unit 6 is mainly responsible for rapidly reducing the control error in the dynamic change process, improving the rise time of the control system and decreasing the overshoot of the control system by rapidly outputting a regulation pulse, which can make the process variable rapidly approach the desired steady-state value.

Because the dynamic control unit 6 is to make the dynamic change process of the controlled object to have relatively short rise time and small overshoot, the output process of the dynamic control unit is designed to be like a pulse-output that comprises two stages which include an increase variation and a decrease variation. And $u_{up}(t)$, $u_{down}(t)$ represent the output value of the increase variation and the decrease variation of the control pulse-output, respectively. The time of change for the process set-point value of the control system is defined by $t_0$.

The algorithms of the dynamic control unit 6 can follow the exemplary principles below.

(1) Principle of the Increase Variation.

$u_m(t)$ is denoted as the peak value of the pulse-output of the ENCPC after the process set-point value of the control system changes in the dynamic change process; Relative to the time $t_0$, $t_m$ is denoted as the time when the ENCPC output reaches $u_m(t)$.

After the process set-point value changes, the ENCPC rapidly changes its output from the initial value $u_0(t)$ at the time $t=t_0$ to the peak value $u_m(t)$. Assuming the future steady-state output value of the ENCPC is $u_{ss}(t)$ (according to equation (5)) after the ENCPC eliminates the control error. Relative to the initial output value $u_0(t)$ of the ENCPC, the variation $\Delta u_m(t)$ of the peak value is:

$$\Delta u_m(t) = u_m(t) - u_0(t) = \alpha \cdot (u_{ss}(t) - u_0(t)) \quad (6)$$

Wherein, α is the gain coefficient of the pulse-output and $\alpha > 1$, and $u_L \le \Delta u_m(t) \le u_{ss}(t)$ or $u_{ss}(t) \le \Delta u_m(t) \le \Delta u_H$. And $u_L$ and $u_H$ are the low limit and high limit of the ENCPC output, respectively.

To ensure that the ENCPC changes its output relatively stably from $u_0(t)$ to $u_m(t)$, a filtering component is designed as shown in equation (7), according to an embodiment:

$$f_{up}(t) = 1 - e^{-\frac{1}{T_{up}}(t-t_0)} \quad (7)$$

Wherein, $T_{up}$ is the filter time constant for the increase of the pulse-output, and $T_{up} < t_m$, and $T_{up} = 1 \sim 5 T_s$, where $T_s$ is the sampling control cycle. By combining equations (6) and (7), the law of the increase variation $u_{up}(t)$ of the pulse-output is deduced as:

$$u_{up}(t) = u_0(t) + \alpha \cdot (u_{ss}(t) - u_0(t)) \cdot f_{up}(t) \quad (8)$$

From equations (7) and (8), it is derived that the initial value of $u_{up}(t)$ at the time $t=t_0$ is $u_0(t)$, and its stable variation value is $u_{up}(t) = u_0(t) + \Delta u_m(t) = u_m(t)$.

(2) Principle of the Decrease Variation.

Relative to the time $t_0$, $t_d$ is denoted as the time when the ENCPC changes its output to the opposite direction after it reaches the peak value $u_m(t)$. When control time $t \ge t_0 + t_d$, the output signal of the ENCPC quickly changes to be close to the future steady-state output value $u_{ss}(t)$. In order that the ENCPC makes a stable output change from $u_m(t)$ to $u_{ss}(t)$, and for the guarantee of adjustment effects, one other filtering component is also designed as shown in equation (9), according to an embodiment:

$$f_{down}(t) = 1 - e^{-\frac{1}{T_{down}}(t-t_d)} \cdot \frac{|e(t)|}{|e(t_d)|} \quad (9)$$

Wherein, $T_{down}$ is the filter time constant for the decrease of the pulse-output, and $T_{down} = 0.1 \sim 0.5T$; $|e(t)|$ is the absolute value of the current control error; and $|e(t_d)|$ is the absolute value of the control error at the time $t=t_0+t_d$. Accordingly, the law of the decrease variation $u_{down}(t)$ of the pulse-output is as follows:

$$u_{down}(t) = u_m(t) + (u_{ss}(t) - u_m(t)) \cdot f_{down}(t) \quad (10)$$

From equations (9) and (10), it is derived that the initial value of $u_{down}(t)$ at the time $t=t_0+t_d$ is $u_m(t)$, and its stable change value is the steady-state output value $u_{ss}(t)$.

The steady-state control unit 18 and its algorithms have the following features.

The steady-state control unit 18 plays the major role of further eliminating control error in the steady change process and improving the control precision.

According to an embodiment, when the control error and its change value satisfy $|e(t)| \le \epsilon_1$ and $|\Delta e(t)| \le \epsilon_2$, wherein $\epsilon_1, \epsilon_2$ are both positive real numbers and $\epsilon_2 < \epsilon_1$, the current moment is denoted as $t_{ss}$ relative to the time $t_0$. In order to quickly eliminate the control error and improve control precision, when control time $t \ge t_0 + t_{ss}$, the control output of the ENCPC is switched from the decrease variation $u_{down}(t)$ of the pulse-output to proportional and integral control law as shown in equation (11):

$$u_s(t)=u_s(t-1)+K_p \cdot \Delta e(t)+K_i \cdot e(t) \tag{11}$$

Wherein, $u_s(t)$ is the control output signal of the ENCPC during the steady change process, and $K_p$, is the proportional coefficient, and $K_1$ is the integral coefficient, and $u_s(t-1)$ is the ENCPC output value of the last sampling control cycle, and $\Delta e(t)$ is the change value of the current control error. When the control system becomes stable, the final $u_s(t)$ replaces the original calculated steady-state output value $u_{ss}(t)$, and the current output is kept unchanged. If there is random noise, and when the absolute value of the control error $|e(t)| \geq \epsilon_3$, the following control rule can be applied:

$$u_s(t)=u_{ss}(t)+K_p \cdot e(t) \tag{12}$$

Wherein $\epsilon_3$ is a positive real number.

The cooperative control unit 14 and its algorithms have the following features.

The cooperative control unit 14, in accordance with the real-time operation status of the control system, coordinates the operations of the identification control unit 4, the dynamic control unit 6 and the steady-state control unit 18, and generates the final control output signal.

According to an embodiment, (1) when the control time $t \geq 0$, the identification control unit 4 is in working condition, and identifies the model parameters K, T, τ of the controlled object;

(2) When the control time $t_0 \leq t < t_0+t_{ss}$, the dynamic control unit 6 is in working condition;

Wherein, when the control time $t_0 \leq t < t_0+t_d$, the ENCPC outputs its increase variation law of the pulse-output $u_{up}(t)$, i.e. equation (8);

Wherein, when the control time $t_0+t_d \leq t < t_0+t_{ss}$, the ENCPC outputs its decrease variation law of the pulse-output $u_{down}(t)$, i.e. equation (10).

(3) When the control time $t \geq t_0+t_{ss}$, the steady-state control unit 18 is in working condition, and the ENCPC outputs its steady-state control law $u_s(t)$, i.e. equation (11); if there is random noise, when the absolute value of control error $|e(t)| \geq \epsilon_3$, the control law in equation (12) is in use.

When the process set-point value changes again, the control time t is reset to the time $t_0$, and the above control work process steps (2) to (3) are repeated.

The adjustment method of the control parameters is as below.

The dynamic control unit 6 and the steady-state control unit 18 of the invention are relatively independent from each other, and therefore their control parameters can be individually adjusted.

(1) According to the speed of increase and the amount of the overshoot of the process variable in the dynamic change process, α or $t_d$ can be adjusted. If there is an excessive overshoot or an overtly rapid rise, α or $t_d$ can be reduced; if there is an inadequate overshoot or an overtly slow rise, α or $t_d$ can be increased.

(2) According to the changes of the process variable in the steady change process, the proportional coefficient $K_p$ and integral coefficient $K_i$ can be adjusted. If the speed of process variable approaching the steady-state is too slow, the proportional coefficient $K_p$ can be increased; if the speed of process variable approaching the steady-state is too fast, the proportional coefficient $K_p$ can be decreased. If the control precision is very poor, the integral coefficient $K_i$ can be increased; if there is a steady-state oscillation, the integral coefficient $K_i$ can be decreased.

(3) Other control parameters $T_{up}$, $T_{down}$ are set within the defined specified range of values, i.e. $T_{up}=1 \sim 5T_s$, and $T_{down}=0.1 \sim 0.5T$.

Figure 3:
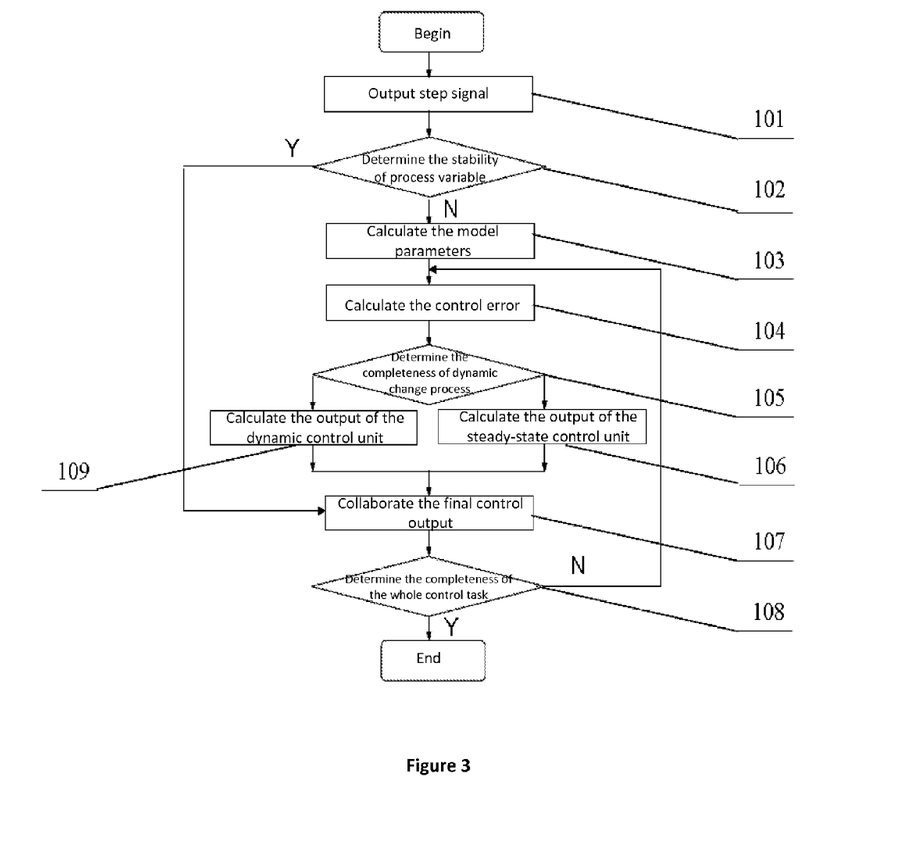
FIG. 3 is a flow chart of the software-based control algorithm of according to an embodiment.

The invention of the embedded nonlinear cooperative pulse-controller is characterized in that its control algorithm module 19 also comprises: output step signal 101, determine the stability of process variable 102, calculate the model parameters 103, calculate the control error 104, determine the completeness of dynamic change process 105, calculate the output of the steady-state control unit 106, collaborate the final control output 107, determine the completeness of the whole control task 108, calculate the output of the dynamic control unit 109 (as shown in FIG. 3).

Figure 2:
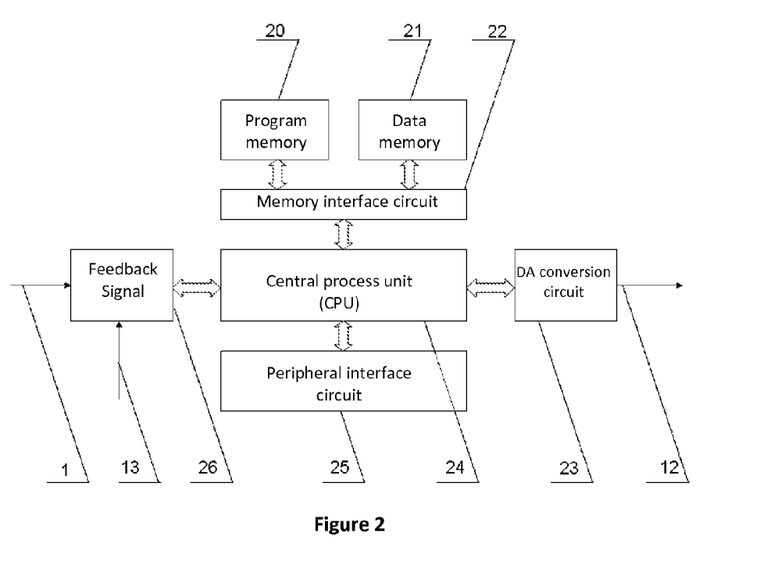
FIG. 2 is a block diagram of the hardware system composition according to an embodiment.

One embodiment of the disclosed embedded nonlinear cooperative pulse-controller (as shown in FIG. 2) comprises AD conversion circuit 26, program memory 20, data memory 21, memory interface circuit 22, DA conversion circuit 23, central processing unit CPU 24 and peripheral interface circuit 25, which are all interconnected by electrical signals. The embedded nonlinear cooperative pulse-controller is characterized in that its control algorithm module 19 comprises: the comparison module 2 that plays the major role of generating the control error; the identification control unit 4 that, mainly through step response, identifies model parameters such as the amplification gain, the time constant and the delay time of the controlled object; the dynamic control unit 6 that plays the major role of rapidly reducing the control error in the dynamic change process, improving the rise time of the control system and decreasing the overshoot of the control system by rapidly outputting a regulation pulse, which can make the process variable rapidly approach the desired steady-state value; the steady-state control unit 18 that plays the major role of further eliminating the control errors in the steady change process and improving the control precision, according to the future steady-state output of the ENCPC and in conjunction with proportional and integral control laws; and the cooperative control unit 14 that is responsible for coordinating the operations of the identification control unit 4, the dynamic control unit 6 and the steady-state control unit 18 and generating the final control output signals. The control algorithm module 19 of the ENCPC enables that the ENCPC can quickly and stably eliminate the control errors with short rise time, small overshoot and short settling time.

Among them, the hardware comprises mainly two parts: a host and peripheral interfaces.

1) Host

Program memory 20 uses flash memory as the memory for the programs and the control parameters, and stores the control algorithm software, operating system, communication software, WEB remote access software and input/output interface software of the ENCPC;

Data memory 21 uses SDRAM as the computer internal memory, providing the exchange space of internal data during the system runs;

Memory interface circuit 22 provides the interface circuit between the central processing unit CPU 24 and the program memory 20, and data memory 21;

Central processing unit CPU 24, as the control center, is responsible for the coordination of the various components of the ENCPC, and can adopt microchips with 32-bit and 300 MHZ or so main frequency, such as the ARMS series chip;

The host uses external power supply;

2) Peripheral Interface

AD conversion circuit 26 mainly provides the interfaces of 4-20 mA current input and 1-5 VDC voltage input, and the interface circuit connected to the central processing unit CPU 24 with electrical signals;

DA conversion circuit 23 mainly provides the interfaces of 4-20 mA current output and 1-5 VDC voltage output, and the interface circuit connected to the central processing unit CPU 24 with electrical signals;

Peripheral interface circuit 25 provides the interfaces of standard USB, VGA, RJ45, RS232, RS485, and the interface circuit connected to the central processing unit CPU 24 with electrical signals;

The software of the ENCPC mainly comprises: the software of the control algorithm module of the ENCPC, operating system, communication software, WEB remote access software and input/output interface software; wherein, 1) The software of the control algorithm module has the following characteristic:

In accordance with principle of the algorithm module of the ENCPC, the control algorithm module 19 of the ENCPC is developed by using the embedded C++ language.

2) The operating system has the following characteristic:

An embedded operating system such as Microsoft Windows CE (an operating system developed by Microsoft for embedded systems), etc. that is compatible with Microsoft Windows (a series of graphical interface operating systems developed, marketed, and sold by Microsoft) applications is adopted;

3) The communication software has the function that supports TCP/IP protocol, RS232 or 485 protocol;

4) The WEB remote access software performs remote access, communication and operation functions;

5) Input/output interface software performs the input/output of analog signals or digital signals.

Described herein is an embodiment of the embedded nonlinear cooperative pulse-controller (as shown in FIG. 1). The process set-point value 1 is the input signal of the control system; the output signal of the controller 9 is connected with the controlled object 10; the process variable signal 12 is converted to the feedback signal 13 by a feedback channel; both the process set-point value 1 and the feedback signal 13 enter the comparison module 2, which generates the control error 3. Output signal of the controller 9, the process variable signal 12 and the process set-point value 1 are transmitted through their respective transmission channels and inputted to the identification control unit 4.

The process objects A and B are selected as the controlled objects to examine the control performance of the ENCPC. Wherein, the process object A is a process object of first-order inertia with great time-delay, and $\tau/T \gg 1$, and its transfer function is as follows:

$$G(s) = \frac{1}{33s+1} e^{-69s} \quad (13)$$

If the conventional control algorithms are applied to control the process object, it is difficult to obtain a satisfactory control effect. The process object B is a non-minimum phase temperature object with time-delay, and its transfer function is as follows:

$$G(s) = \frac{0.6394s - 1.582}{s^2 + 0.3287s + 0.01282} e^{-4s} \quad (14)$$

The model not only is a non-minimum phase system, but also has the reverse characteristics and time-delay. The non-minimum phase systems are prevalent in the field of control engineering, such as the navigation control systems of ships, the depth control system of torpedoes, the turbine control systems etc. Designs of the non-minimum phase control system must meet various performance requirements, which is a difficulty in control engineering field.

The control algorithms of the disclosed embedded nonlinear cooperative pulse-controller (ENCPC) and conventional PID control algorithms were compared. To make the comparison more clearly, both the control parameters of ENCPC and the traditional PID control algorithms are optimized. The optimal conditions for the optimization parameters of PID are the same with ENCPC. In the simulation, the GATOOL Matlab toolbox is used for both simulation experiments, wherein the number of individuals in the initial population is 50; the evolution generation is 500; the lower limit of the search parameters is 0; the initial range is [0, 1]; other parameters are the default values. The optimization of the control parameters is shown in Table 1 and 2.

Other control simulation parameters are as follows: the sampling control cycle $T_s$=1.0 second; the filter time constant for the increase of the pulse-output $T_{up}$=2$T_s$; the filter time constant for the decrease of the pulse-output $T_{down}$=0.3T; the threshold parameters $\epsilon_1$=0.005, $\epsilon_2$=0.001, $\epsilon_3$=0.0006. By using two-point identification method of step response, the model parameters of the process A and B are obtained. Wherein, the identified model parameters of the process object A are K=1.0, T=34, $\tau$=69; the identified model parameters of the process object B are K=−123.4, T=24.0, $\tau$=8.0.

TABLE 1

Optimized control parameters of the traditional PID

| Control parameters | | $K_p$ | $K_i$ | $K_d$ |
|---|---|---|---|---|
| Objects | A | 0.55821 | 0.0097675 | 7.720846 |
| | B | 0.03026 | 0.00032 | 0.24945 |

TABLE 2

Optimized control parameters of the ENCPC

| Control parameters | | $K_p$ | $K_i$ | $\alpha$ | $T_d$ |
|---|---|---|---|---|---|
| Objects | A | 0.027063 | 3.9907E−8 | 1.2768 | 4.2049 |
| | B | 0.0054815 | 0.00014518 | 2.1047 | 2.0364 |

Figure 4A:
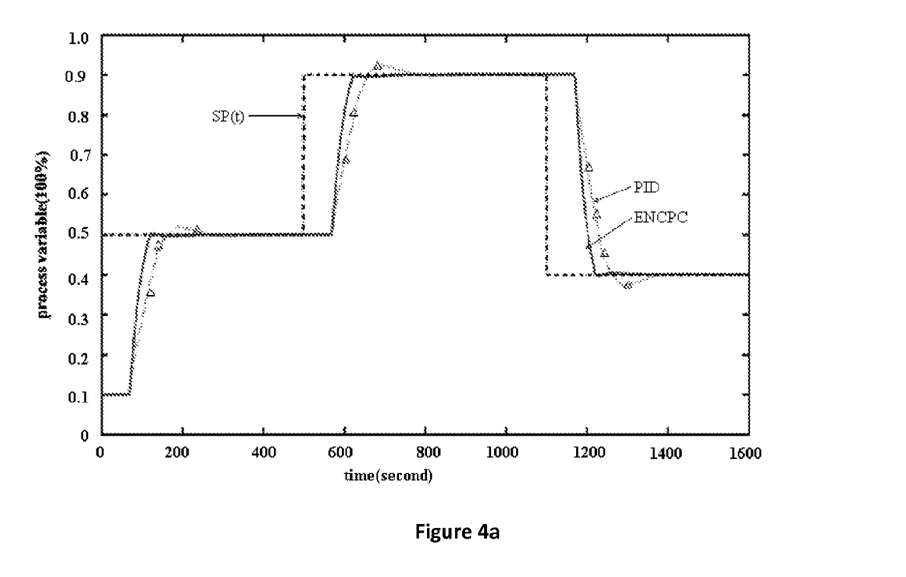
FIGS. 4a and 4b are one embodiment of a comparison chart of the process control effects of the process object A.
Figure 4B:
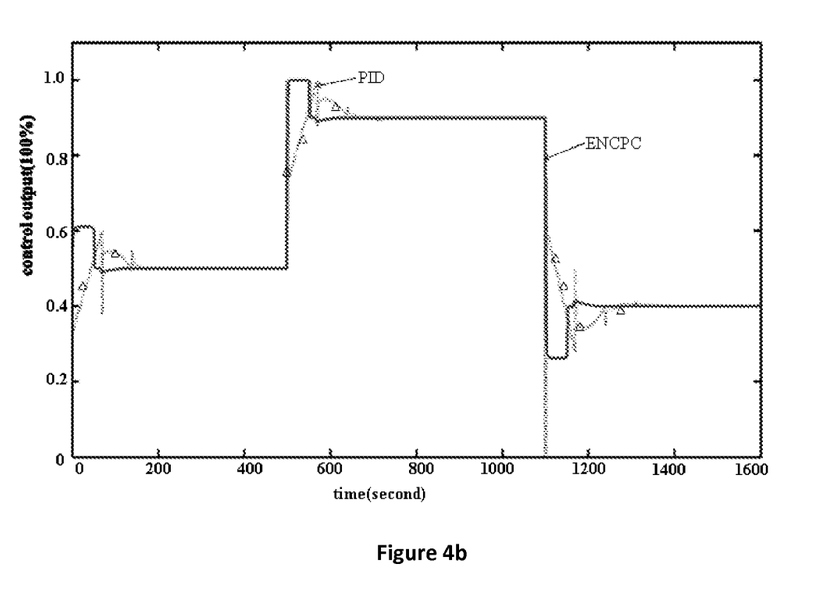

FIG. 4a and FIG. 4b, respectively, show the comparison chart of the process variable of the process object A and the output effect of the ENCPC. From these two figures, it is obvious that the rise time, the overshoot and the settling time and other performance indexes of ENCPC are all better than the performance of traditional PID control. The output of ENCPC is more stable than the output of the traditional PID. As seen from FIG. 4a, compared with traditional PID control, ENCPC has better control effect. Its rise time $t_r$ is about 35 seconds, and the overshoot σ% is about 0, and the settling time $t_s$ is about 113 seconds. Additionally, its effect is better than reports in previous literature [1] (Donghai Li, Yongqiang Wu, Liqin Li et. al., Simulation study of PID control system for several industrial plants [J], Application of Electronic Technique, 2000, 26 (8):24-26.), with feed forward PID control performance $t_r$=155 seconds, σ%=5.5%, $t_s$=200 seconds.

Figure 5A:
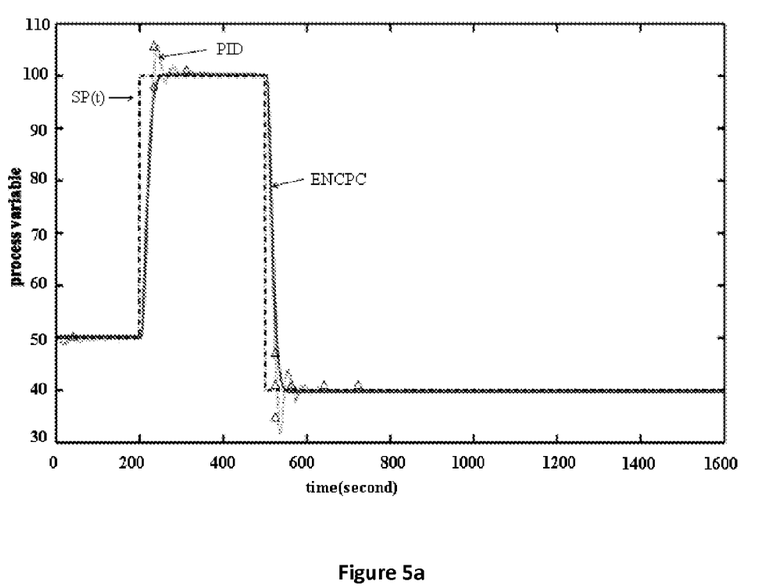
FIGS. 5a and 5b are one embodiment of a comparison chart of the process control effects of the process object B.
Figure 5B:
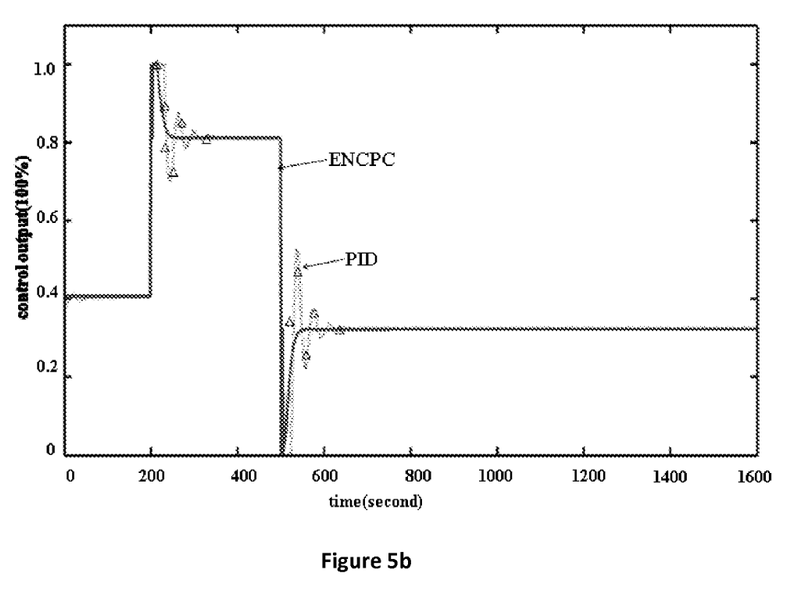

FIG. 5a and FIG. 5b, respectively, shows the comparison chart of the process variable of the process object B and the output effect of the ENCPC. From these two figures, it is obvious that the rise time, the overshoot and the settling time and other performance indexes of ENCPC are better than traditional PID control performance. The output of ENCPC is more stable than the output of the traditional PID. As seen from FIG. 5a, compared with traditional PID control, ENCPC has better control effect. Its rise time $t_r$ is about 28 seconds, and the overshoot σ% is about 0, and the settling time $t_s$ is about 36 seconds. Additionally, its effect is better than reports in previous literature [2] (ShuShu Ma, SongXi Chen, Jun Yang, Research on IMC-PID control for the complex time-delay system reduction [J], Industrial Instrumentation and Automation, 2010, (2):3-5, 11.), with IMC-PID control results $t_r$=30 seconds, σ%=5.0%, $t_s$=60 seconds. From the simulation results, it is shown that the control performances of ENCPC are all superior to traditional PID control algorithms.

In summary, the ENCPC described herein can rapidly control the process object with strong robustness, and has more simple structure and better anti-interference characteristics.

We claim:

1. A method of adjusting a process variable of a controlled object using a controller, the process variable being responsive to a change of an output of the controller, the method comprising:
   determining values of one or more predetermined model parameters of the controlled object, the predetermined model parameters being characteristic of response of the process variable to the change of the output of the controller;
   determining a steady-state output value of the controller at least partially based on a set-point value of the process variable and at least one of the one or more predetermined model parameters, wherein the process variable approaches the set-point value of the process variable in response to the output of the controller changing to the steady-state output value of the controller;
   determining the output value of the controller from a linear function of the steady-state output value;
   setting the output of the controller to the determined output value;
   wherein the values of one or more predetermined model parameters of the controlled object are determined from a response of the process variable to a step change of the output of the controller;
   wherein the values of one or more predetermined model parameters of the controlled object are determined from the response of the process variable to the step change of the output of the controller using values of the process variable at two time points during the response;
   wherein one of the time points is when the process variable is 0.38 times of a steady-state value of the process variable after the step change.

2. The method of claim 1, further comprising determining a control error between an actual value of the process variable and the set-point value of the process variable.

3. The method of claim 1, wherein the one or more predetermined model parameters of the controlled object are selected from the group consisting of amplification gain, time constant and delay time.

4. The method of claim 1, wherein setting the output of the controller comprises adjusting the output of the controller based on an initial value of the output of the controller, the steady-state output value of the controller, time, and the one or more predetermined model parameters.

5. The method of claim 1, wherein setting the output of the controller is independent from an actual value of the process variable in a dynamic change process.

6. The method of claim 1, wherein setting the output of the controller comprises adjusting the output of the controller based on an initial value of the output of the controller, the steady-state output value of the controller, time, the one or more predetermined model parameters and a control error between an actual value of the process variable and the set-point value of the process variable.

7. A computer program product comprising a non-transitory computer readable medium having instructions recorded thereon, then instructions when executed by a computer implementing the method of claim 1.

8. The method of claim 1, wherein the at least one of the one or more predetermined model parameters is an amplification gain of the controlled object.

9. The method of claim 1, wherein one of the time points is when the process variable is 0.63 times of a steady-state value of the process variable after the step change.

* * * * *